G. H. M. BAKER.
SAW GUIDING AND FEEDING DEVICE.
APPLICATION FILED JUNE 19, 1909.
969,240.
Patented Sept. 6, 1910.
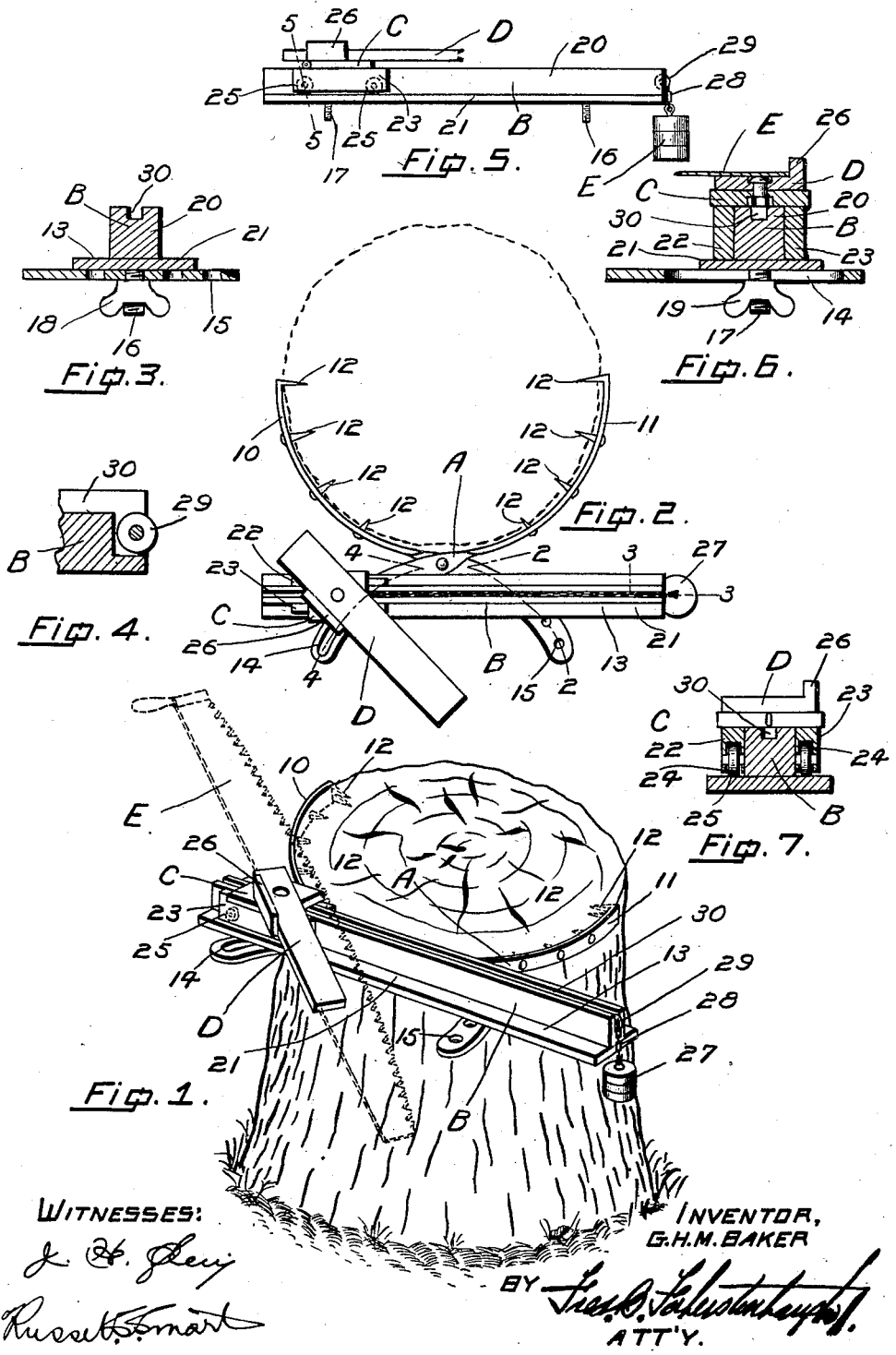
WITNESSES:
INVENTOR,
G.H.M. BAKER
BY
ATT'Y.

UNITED STATES PATENT OFFICE.

GODFREY HUGH MASSY BAKER, OF OTTAWA, ONTARIO, CANADA.

SAW GUIDING AND FEEDING DEVICE.

969,240.      Specification of Letters Patent.      Patented Sept. 6, 1910.

Application filed June 19, 1909. Serial No. 503,146.

*To all whom it may concern:*

Be it known that I, GODFREY HUGH MASSY BAKER, of Ottawa, in the county of Carleton, Province of Ontario, Canada, have invented certain new and useful Improvements in Saw Guiding and Feeding Devices, of which the following is a specification.

My invention relates to improvements in saw guiding and feeding devices, and the objects of my invention are to provide a device of this character of maximum simplicity, which may be clamped to any size of a tree or like object being cut, and which may be adjusted to feed the saw across the tree with a uniform pressure.

In its construction, the invention includes a pair of clamping tongs adapted to engage a tree and a gravity operated guiding and feeding device adjustably supported from the tongs, as hereinafter more fully set forth and described in the accompanying specification and drawings.

In the drawings,—Figure 1 is a perspective view of the device on the stump of a tree, the tree being shown as sawed through, for the sake of clearness. Fig. 2 is a plan view of the device with the tree indicated in dotted lines. Fig. 3 is a section along the line 2—2, Fig. 2. Fig. 4 is a section along the line 3—3, Fig. 2. Fig. 5 is an elevation of the guiding and feeding member. Fig. 6 is a section along the line 4—4, Fig. 2. Fig. 7 is a section along the line 5—5, Fig. 5.

In the drawings, like figures and letters of reference indicate corresponding parts in each figure.

Referring to the drawings, A represents the clamping member which is adapted to engage the tree or like object to be sawed and which is conveniently in the form of a pair of tongs having centrally pivoted arms 10 and 11 which are centrally concaved to conform to the contour of a tree or the like. In order to enable these tongs to grip the tree, a series of spikes 12 are provided on the innerside of each, the length of the spikes being gradually lessened from the outer extremity toward the center, whereby the tongs will be equally effective in operating on small trees.

The outer ends of the arms 10 and 11 are adapted to support the guiding and feeding member B. This consists of a track 13 adjustably supported from the tongs. In the embodiment illustrated, this is accomplished by providing an arcuate slot 14 in the end of one of the arms of the tongs, and a series of perforations 15 in the end of the other arm, bolts 16 and 17 being provided on the tracks extending through the perforations and arcuate slot respectively and being adapted to be clamped in adjusted position by suitable means, as by thumb nuts 18 and 19. The track is formed with a vertically extending member 20 and a base plate 21 of greater width than the same, and projecting at each side of the same to provide supplementary tracks, for a purpose hereinafter explained.

Slidably mounted on the tracks 13 is the guide block C. In the embodiment illustrated, this guide block is provided with flanges 22 and 23 extending over the sides of the central member 20 and having recesses 24 therein, in which are suitably journaled rollers 25 adapted to run on the tracks formed by the projecting base plate 21. These rollers are arranged in pairs on opposite sides of the block and any number desired may be provided. Pivotally secured to the top of the guide block is a guide plate D having a flange 26 on the rear edge of the same adapted to engage and guide the rear side of a suitable cross cut saw E, while the plate D itself supports the underside of the saw.

To continuously and uniformly feed the saw against the tree or the like, a weight 27 is provided connected to the guide block by a chain or cord 28 which extends over a suitable pulley 29 and runs in a groove 30 provided in the top of the central member 20 on the track 13.

In the operation of the device, the tongs are engaged with the tree and the spikes driven in at the height at which it is desired to cut the same. The guiding and feeding member B is then adjusted to proper position and clamped through the thumb nuts 18 and 19. The cross cut saw is then placed in position on the guide plate D and the sawing operation commenced, the saw being operated by one man only, and from one side thereof. The weight will continuously and uniformly feed the saw against the tree and thus the sawing operation may be accomplished by one man. As the saw is only held loosely by the guide plate, it may be quickly removed or its angle changed. The pull of the weight is constant, consequently the feed will be uniform and a better cut can thus be taken, than if the saw was actuated by two men, whose pull would be unequal.

In cases where the device is to be used on trees of near the same diameter, it will only be necessary to adjust one of the clamping thumb nuts 18 or 19, this being preferably the one which is on the bolt operating in the arcuate slot. In this way all it is necessary to do to adjust it, is to loosen and tighten the one thumb nut.

As many changes could be made in the above construction, and many apparently widely different embodiments of my invention, within the scope of the claims, could be made without departing from the spirit or scope thereof, it is intended that all matter contained in the accompanying specifications and drawings, shall be interpreted as illustrative and not in a limiting sense.

What I claim as my invention is:

1. In a saw guiding and feeding device, a guideway, means for connecting the same to a tree or the like, a guide block slidable on the guide-way, a guide plate pivotally connected to the guide block and formed with a flat surface adapted to support the underside of the saw, and with means to slidably engage the rear edge of the saw in such a manner as to cause the guide-plate to swing with the saw during its operation.

2. In a saw guiding and feeding device clamping tongs adapted to engage a tree or the like, one member of the tongs having a slot in the extremity, a guiding and feeding device having clamping means extending through said slot and having means connecting the same with the other member of the tongs to that in which the slot is formed.

3. In a saw guiding and feeding device, a pair of clamping tongs adapted to engage a tree or the like having a slot formed in the outer extremity of one member and a series of perforations in the outer extremity of the other member, and a guiding and feeding device having clamping means adapted to extend through the perforations and slot, respectively.

4. In a saw guiding and feeding device, a guideway, means for connecting the same to a tree or the like, a guide block slidable on the guideway, a guide plate pivotally connected to the guide block and formed with a flat plate adapted to support the underside of the saw and with an upturned flange adapted to slidably engage and guide the rear edge of the saw, and means for feeding the guide block along the guideway.

In witness whereof I have hereunto set my hand in the presence of two witnesses.

GODFREY HUGH MASSY BAKER.

Witnesses:
J. H. LEVY,
WM. A. WYMAN.